Patented July 29, 1952

2,605,251

UNITED STATES PATENT OFFICE 2,605,251

BUTADIENE RUBBERY COPOLYMER STABILIZED WITH 2,4-DIMETHYL-6-OCTYLPHENOL

Leland J. Kitchen and George E. P. Smith, Jr., Akron, Ohio, assignors to The Firestone Tire & Rubber Company, Akron, Ohio, a corporation of Ohio No Drawing. Original application March 9, 1946, Serial No. 653,425. Divided and this application May 10, 1951, Serial No. 231,449

5 Claims. (Cl. 260—45.95)

This invention relates to stabilizers of rubber-like copolymers of a conjugated diene—such as, for example, butadiene, isoprene, 2-cyanobutadiene, pentadiene, piperylene, dimethylbutadiene, etc.—and a nitrile of the general formula $CH_2=C(R)-CN$ where R is H, $CH_3$, $C_2H_5$, $C_3H_7$ or Cl. The stabilizers preserve both the uncured and cured copolymers from stiffening and from atmospheric deterioration. The invention includes compositions which contain the stabilizer and methods of using the stabilizer. It will be described more particularly as applied to the stabilization of rubber-like copolymers of butadiene and acrylonitrile.

Many phenols, including para-alkylated phenols, evidence antioxidant properties when mixed with the rubber-like vulcanizates obtained from copolymers of butadiene and acrylonitrile, but they cause stiffening of the uncured or cured copolymers with which they are mixed. This stiffening is prevented by secondary aryl amines, such as phenyl-beta-naphthylamine, which are recognized as antioxidants for these rubber-like materials. These secondary aryl amines, when used alone, are effective stabilizers but discolor badly and are not satisfactory for use in light-colored stocks, such as those weighted with zinc oxide, titanium dioxide or the like and used in the white side walls of tires, for example.

The stabilizers of this invention are the 2,4-dimethyl-6-octylphenols. The octyl group is preferably a tertiary octyl radical. A preferred stabilizer, 2,4-dimethyl-6-(alpha,alpha,gamma,gamma-tetramethylbutyl) phenol, may be prepared by alkylating 2,4-dimethylphenol by means of diisobutylene, for example as described in detail below.

While the stabilizers of this invention may be added to the copolymer composition to be preserved in any conventional manner, such as by mill or Banbury mixing, they are preferably added directly to the latex which results from the emulsion copolymerization. Thus, the stabilizer is incorporated before coagulation and drying of the copolymer have been effected. It is of advantage to add the stabilizer to the latex as soon as possible after the copolymerization reaction has been carried out to the degree desired because of the comparative instability of unstabilized copolymer, both in the latex form and in the coagulated form.

The stabilizers of this invention are not to be confused with the so-called "stabilizers" which impart coagulation resistance to the latex. The stabilizers of this invention impart to the rubber-like copolymer a resistance to aging evidenced by resistance to deteriorative changes, such as stiffening, "set-up," loss of tensile strength, discoloration or embrittlement, which tend to take place when such rubber-like materials in which no stabilizer is incorporated are aged or treated at elevated temperatures, and for particularly unstable copolymers, even at room temperatures. Such deteriorative changes are thought to be associated, in part, with oxygen.

The stabilizers of this invention are of the nondiscoloring type. They have special value when used with white or light-colored copolymer compounds. In the production of the copolymers for such use, the stopping agents employed should be of the nondiscoloring type. Hydroquinone, frequently used as a stopping agent, tends to discolor latices to which it is added, and its use should be avoided.

If it is not convenient to use a nondiscoloring stopping agent in preparing the copolymer to be used in carrying out this invention, the use of a stopping agent may be dispensed with, particularly if the copolymer is coagulated and dried within several hours after the desired degree of copolymerization has been reached. The latices used in the following examples were prepared without any stopping agent to obtain clear-cut stabilizer tests and avoid the possibility of obscuring test results by the transient stabilizer action which sometimes accompanies the use of certain stopping agents.

The stabilizer is conveniently added to the latex in emulsion form. For example, it may be emulsified in 5 per cent sodium oleate solution. A stabilizer which is solid at room temperature may be emulsified by first dissolving it in a small volume of warm alcohol and then adding the alcohol solution to about four times its volume of stirred aqueous sodium oleate solution.

After coagulation of the latex, the commercial drying of the copolymer is carried out at an elevated temperature; e. g., 240° F. for a period of 50 to 60 minutes. These conditions are sufficienty drastic to cause discoloration and stiffening of unstabilized copolymer, especially those copolymers which are not high in acrylonitrile content; e. g., those with an acrylonitrile content of 30 per cent or less. Consequently, to produce the best light-colored copolymer, the stabilizer should be present during the drying operation.

Unstabilized copolymer deteriorates on standing. For instance, storage for one year at 25° C. is approximately equivalent to four days' oven-aging of the copolymer at 90° C. The copolymer to which stabilizer is added in latex form is capable of storage, even at higher temperatures, without substantial deterioration.

On the laboratory scale, wet copolymer samples were dried 20 hours at 70–75° C., this drying being less conducive to discoloration and other effects of aging than the higher temperature methods used commercially. The following table gives the results of this test which are typical of results produced by the use of the stabilizer of this invention:

|  | Color | Condition |
| --- | --- | --- |
| Stabilized copolymer | White | Nonheatcured.[1] |
| Unstabilized copolymer | Cream to light tan | Heatcured and stiffened.[1] |

[1] "Heatcured" means evidence of incipient deterioration resembling a slight degree of vulcanization.

The noted change in the physical properties of the unstabilized copolymer is undesirable because it renders it more difficult to process and necessitates reversal by mill "breakdown" which is time consuming and expensive.

2,4-dimethyl-6-(alpha,alpha,gamma,gamma-tetramethylbutyl) phenol

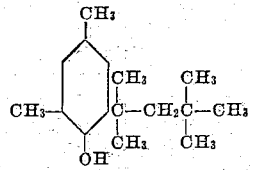

Fifty grams of 2,4-dimethylphenol containing 5 grams of catalyst (45 per cent boron trifluoride in ether) were stirred while adding 200 grams of diisobutylene by means of a dropping funnel during a period of 15 minutes. The temperature rose to 60° C.; and stirring was continued at 50–60° (hot plate) for an hour after the addition of diisobutylene was complete. The reaction mixture was washed with water and then dilute sodium hydroxide solution, dried over anhyd. potassium carbonate, and distilled through a 1-foot column packed with Raschig rings to yield 68 grams (71 per cent) of 2,4-dimethyl-6-(alpha,-alpha,gamma,gamma-tetramethylbutyl) phenol, a water-white, slightly viscous liquid with practically no odor and having B. P. 144–145.5° at 10 mm. and refractive index, $n_D^{22.5}$=1.5106.

This trialkyl phenol was found to be an effective stabilizer for butadiene-acrylonitrile copolymer when tested in copolymer of the type high in acrylonitrile content, being not only of the same order of effectiveness as phenyl beta-naphthylamine but also yielding a stabilized copolymer nondiscoloring in nature when incorporated in the otherwise uninhibited copolymer in place of the customary discoloring antioxidant. For comparative purposes, copolymer samples were prepared from the same uninhibited latex by addition of sodium oleate solution containing no stabilizer in emulsion to serve as "blanks." "Controls" were prepared by adding an emulsion of 2 per cent phenyl beta-naphthylamine (a standard effective stabilizer for use in butadiene-acrylonitrile copolymer compositions) in sodium oleate solution prepared in like manner. The "test" sample was prepared in a similar manner by adding an emulsion of 2 per cent of the trialkyl phenol in sodium oleate solution to the uninhibited latex.

Effectiveness of the alkylated phenol as a stabilizer for the copolymer was demonstrated by oven-aging samples of the test copolymer and the control for 96 hours at 100° C. At the end of this aging period, both test and control were in good condition and both were set-up or heat-cured to a similar degree. The degree of heat-curing of the two copolymer samples then was ascertained by a milling procedure. A 180-gram sample of copolymer which had been aged as described above (96 hours at 100° C.) was folded twice and passed through a cold mill (circulating water) once. The rolls of the mill were set at a distance of 0.05 inch apart. The sample was then milled; and the time required for a band without holes to form on the outer roll of the mill was noted. The tests compared as follows:

|  | Break-down Time after Aging 96 Hours at 100° C. |
| --- | --- |
|  | Seconds |
| Test | 14 |
| Control | 12 |

It might be noted, for comparison with the above break-down times of 14 and 12 seconds, that test samples stabilized with stabilizers which were only fairly good had break-down times ranging from 50 to 125 seconds; and a polymer sample prepared without stabilizer was not completely broken down in 210 seconds in this test.

The copolymers stabilized with this alkylated phenol were nondiscoloring, as was shown by observation of the copolymer samples:

|  | Color after Drying and before Aging | Color after Aging 96 Hours at 100° C. |
| --- | --- | --- |
| Test | white | tan. |
| Control | brown | brown. |

The alkylated phenol is satisfactory for drying without discoloration.

Effectiveness of this trialkyl phenol as stabilizer for vulcanizates based upon butadiene-acrylonitrile copolymer compositions was determined by mixing the above copolymer samples according to Formula 1:

FORMULA 1

|  | Parts |
| --- | --- |
| Copolymer (with and without stabilizer) | 100.0 |
| Stearic acid | 3.5 |
| Sulfur | 2.0 |
| Zinc oxide | 5.0 |
| Carbon black | 40.0 |
| Accelerator (cyclohexyl benzothiazyl sulfenamide) | 1.3 |

Vulcanization conditions were 80 minutes of cure at 274° F. The following physical testing data was obtained:

NORMAL PROPERTIES

| Vulcanizate from: | Test Copolymer | 300% Modulus | Tensile | Elongation |
| --- | --- | --- | --- | --- |
| Unaged copolymer | Test | 1,100 | 4,200 | 600 |
| Do | Control | 1,000 | 4,325 | 640 |
| Oven-aged copolymer 4 days at 110° C. | {Test | 1,325 | 4,175 | 590 |
|  | {Control | 1,275 | 3,675 | 540 |

PROPERTIES OF VULCANIZATES OVEN-AGED 4 DAYS AT 212° F.

| Unaged copolymer | Test | 2,700 | 3,825 | 380 |
| Do | Control | 2,450 | 4,050 | 400 |
| Oven-aged copolymer | Test | 3,325 | 4,350 | 370 |
| Do | Control | 3,200 | 3,525 | 330 |

PROPERTIES OF VULCANIZATES BOMB-AGED 15 HOURS AT 260° F.; 60# AIR

| Unaged copolymer | Test | 2,850 | 2,850 | 300 |
| Do | Control | 2,925 | 3,450 | 330 |

In evaluating the data on aging of vulcanizate compositions derived from synthetic copolymers of this type, both modulus and tensile changes should be considered. Loss of vulcanizate quality results both in lowering of tensile strength and increase in modulus. The marked changes in modulus in the above tests demonstrates the equivalence in stability of the test stock to the control stock.

The test antioxidant and stabilizer was found to impart no discoloration to white test vulcanizates. Test stocks were mixed according to the following formula:

FORMULA 2

| | Parts |
|---|---|
| Polymer containing 2% stabilizer | 100.0 |
| Coumarone resin | 7.5 |
| Sulfur | 2.25 |
| Magnesium oxide | 5.0 |
| Zinc oxide | 85.0 |
| Neutral clay | 20.0 |
| Titanium dioxide | 20.0 |
| Benzothiazyl disulfide | 1.1 |
| Zinc diethyldithiocarbamate | 0.2 |

The vulcanizates (cured 40 minutes at 280° F.) had the following colorations after exposure tests:

| | Fadeometer Test, 10 Hours at 125° F. | Sunlamp Exposure, 16 Hours at 7 Inches |
|---|---|---|
| Test | white | white |
| Control | brown | brown |

Thus, the stabilizers of this invention prevent stiffening of the uncured copolymer during drying without substantial discoloration, and prevent stiffening of the uncured copolymer during milling, and this, too, without substantial discoloration. Also, they serve as antioxidants in the vulcanizate and without substantial discoloration. They are, therefore, particularly useful in white and other light-colored compositions although they may also be added to dark products. Although the specific example of the invention discloses stabilization of the copolymer by means of 2 per cent of the stabilizer, larger or smaller proportions of the stabilizer may be employed as is known in the art of synthetic rubber compounding. Ordinarily, less than 5 parts of stabilizer per 100 parts of copolymer will be used. This application is a division of application Serial No. 653,425, filed March 9, 1946, now abandoned.

What we claim is:
1. Uncured, rubber-like copolymer of butadiene and acrylonitrile stabilized with 2,4-dimethyl-6-(alpha,alpha,gamma,gamma - tetramethylbutyl) phenol.
2. Cured, rubber-like copolymer of butadiene and acrylonitrile stabilized with 2,4-dimethyl-6-(alpha,alpha,gamma,gamma - tetramethylbutyl) phenol.
3. The process of drying uncured, rubber-like copolymer crumb from the emulsion copolymerization of butadiene and acrylonitrile, which comprises drying the same in the presence of 2,4-dimethyl - 6-(alpha,alpha,gamma,gamma-tetramethylbutyl) phenol.
4. Rubber-like copolymer of butadiene and acrylonitrile stabilized with 2,4 - dimethyl - 6-octylphenol.
5. Rubber-like copolymer of butadiene and acrylonitrile stabilized with 2,4-dimethyl-6-tert-octylphenol.

LELAND J. KITCHEN.
GEORGE E. P. SMITH, JR.

No references cited.